United States Patent [19]
Gold

[11] Patent Number: 4,823,738
[45] Date of Patent: Apr. 25, 1989

[54] FREE-WHEELING DISPENSER MECHANISM FOR MANUALLY OPERATED ANIMAL FOOD DISPENSING MACHINE

[75] Inventor: Arthur Gold, Northbrook, Ill.
[73] Assignee: Carousel Industries, Inc., Des Plaines, Ill.
[21] Appl. No.: 31,864
[22] Filed: Mar. 30, 1987
[51] Int. Cl.$^4$ ............................................. A01K 5/00
[52] U.S. Cl. ................................. 119/51 R; 222/370
[58] Field of Search ..................... 119/52 A, 53, 53.5, 119/54, 56 R, 51 R; 221/264, 265; 222/367, 370

[56] References Cited

U.S. PATENT DOCUMENTS

| | | | |
|---|---|---|---|
| 2,543,934 | 3/1951 | Poskey | 222/370 |
| 2,664,227 | 12/1953 | Probasco | 222/370 |
| 2,680,540 | 6/1954 | Probasco | 222/370 |
| 3,028,049 | 4/1962 | Eppy | 221/265 |
| 3,804,294 | 4/1974 | Householder | 221/265 X |
| 3,822,004 | 7/1974 | Bolen, Jr. | 221/265 X |

Primary Examiner—Robert Peshock
Assistant Examiner—R. Thomas Price
Attorney, Agent, or Firm—Myron C. Cass

[57] ABSTRACT

An animal food dispensing machine capable of being operated by a domesticated animal or pet includes a housing provided with a discharge chute, a food storage compartment, a free-wheeling external actuator, and a measuring dispenser mechanism complete the device. In one embodiment of the dispenser, a lower plate is rotatable about a boss and aligns an opening with the discharge chute to discharge a quantity of food therethrough to an outlet. An upper plate mounted in a fixed position guides the food to the lower plate. In another embodiment of the dispenser, a metering plate is included to control a measured quantity of the food to be dispensed. The free-wheeling external actuator assembly coupled to the internal dispenser mechanism is activated by the animal to effect discharge of the metered quantity of food through the discharge chute in the housing in relation to the angular distance through which the actuator assembly is moved by the animal.

5 Claims, 1 Drawing Sheet

FREE-WHEELING DISPENSER MECHANISM FOR MANUALLY OPERATED ANIMAL FOOD DISPENSING MACHINE

BACKGROUND OF THE INVENTION

This invention relates generally to manually operable vending machines for dispensing granular food products, such as the familiar coin-operated gumball, candy or peanut vending machine. More particularly, the invention provides a free-wheeling dispensing mechanism for such a machine which can be operated by a domesticated animal or pet, such as a dog or a cat.

Food vending machines of the coin-operated type generally include a food container globe of glass mounted on a rigid base or housing in which the mechanism for dispensing the food is installed. The housing is supported on a base plate which closes off the bottom open end of the housing. An elongated support rod or standard extends from the base plate through the housing, the dispenser mechanism, and the food container globe into engagement with a cap which can be tightened on the globe by means of a screw plug or other suitable fastener. Operably engaged with the internal dispensing mechanism is an external, manually manipulative actuator, such as a handle or lever, for actuating the internal mechanism to release the food to be dispensed from the globe into an internal chute and through a discharge opening in the housing.

Such a conventional vending machine can require insertion of a coin into a slot in the faceplate of the machine for engaging the external actuator with the internal dispenser mechanism so that food can be dispensed. Non-coin-operated machines also are known. However, in both coin and non-coin operated machines of this type, manipulation of the external actuator requires both appreciable torque and human manipulative skill to activate the dispensing mechanism. Clearly, if a coin-operated machine is to be operated, human skill to insert the coin into the coin slot first is required.

The machine embodying the invention is constructed to permit a domesticated animal or pet, such as a dog or a cat, to manipulate the external actuator means to obtain animal food from the machine. The invention provides an external free-wheeling actuating means and an internal dispenser mechanism which can be readily and easily manipulated by the domesticated animal. The actuating means is rotatable in both a clockwise and a counterclockwise direction to discharge a metered quantity of food related to the angular distance through which the means is rotated by the animal.

SUMMARY OF THE INVENTION

A free-wheeling dispenser mechanism for an animal food dispensing machine constructed to be operable by a domesticated animal or pet, such as a dog or a cat. The machine has a non-coin operable dispenser mechanism assembled internally in the housing and an external actuating means connected to the dispenser mechanism which can be moved by the animal, for example by using its paw. The external actuating means is free-wheeling so that it can be moved in opposite directions and still effect discharge of food from the globe through a discharge chute in the housing. In one embodiment, the dispenser mechanism has two dispenser plates; a lower dispenser plate rotatable about a central axis to align an opening in the plate with the discharge chute to discharge the food, and an upper dispenser plate fixed above the lower plate to guide the food to the lower plate. In another embodiment, a metering plate is provided to meter the quantity of food to be discharged. In both embodiments, the actuating means is a wheel with radial levers conveniently spaced apart and dimensioned to be engaged by the animal. The quantity of food discharged proportional to the angular distance through which the wheel is moved by the animal.

DESCRIPTION OF THE PREFERRED EMBODIMENTS

Figure 1:
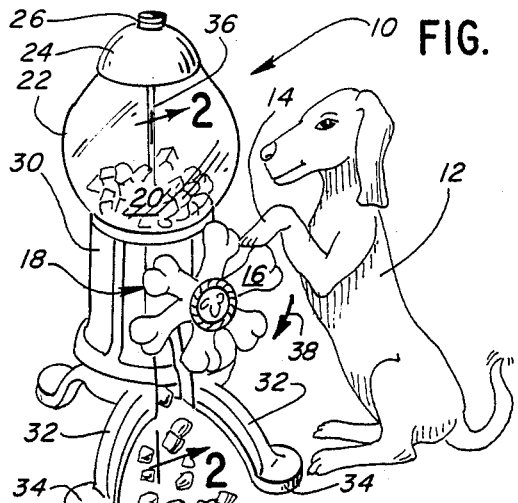
FIG. 1 is a perspective view of a conventional food dispensing machine having the free-wheeling dispenser mechanism embodying the invention installed therein and showing a domesticated animal positioned with its paw engaging the actuator wheel.

Referring to FIG. 1, a conventional animal food dispensing machine embodying the invention is designated generally by the reference numeral 10. Positioned alongside the machine 10 is an animal 12, illustrated as a dog for descriptive purposes. The animal 12 has one paw 14 elevated to engage a lever or spoke 16 of an external actuator wheel 18. Granular animal food particles 20 are shown, stored in a globe-shaped food storage container 22. Although the container 22 can be any suitable shape or material, a transparent material such as glass, is preferred so that the quantity of food in the container can be visually monitored. When it is necessary to replenish the supply of the food 20 in the container 22, a cap 24 can be removed by means of a screw plug 26 to expose a refill port 28 (best seen in FIG. 4) which is provided by the open upper end of the container 22.

In FIG. 1, the container 22 rests on a housing 30. The housing 30 need not have a specific shape or be made of a specific material. However, a heavy material, such as cast iron, is preferred to assure strength and long life for the machine. Legs 32 and feet 34 are provided to further stabilize the animal food dispensing machine 10. The legs 32 and the feet 34 are not restricted to a specific shape or material and can, in fact, be eliminated altogether to enable supporting the machine on a horizontal surface without departing from the present invention.

An elongated support rod 36 extends vertically from the housing 30 through the food storage container 22 and is engaged with the screw plug 26 to assemble the machine 10 into a single unit. When the animal 12 wishes a quantity of the food 20 to be dispensed, the animal can engage the lever 16 of the external actuator wheel 18 to rotate the actuator wheel 18 clockwise in the direction of arrow 38 to dispense the food 20 to the exterior of the machine 10. As will be explained, the wheel 18 can also be rotated counterclockwise.

Figure 4:
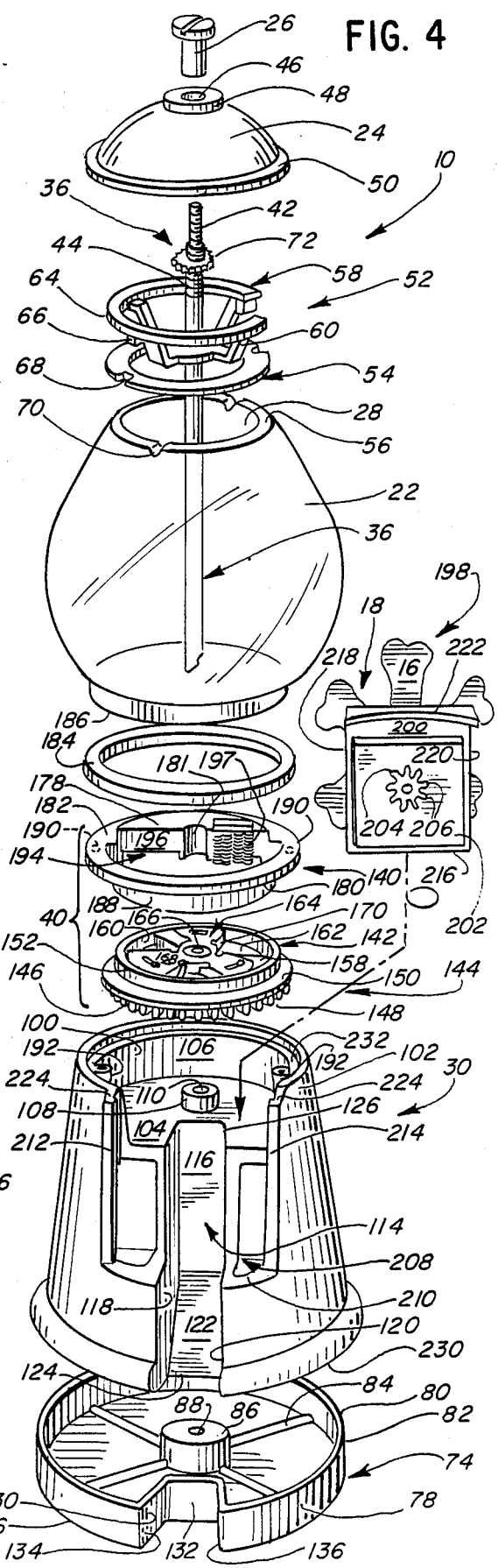
FIG. 4 is an exploded perspective of the machine in FIG. 1 with its faceplate and associated actuator wheel rotated 180° and displaced from the housing.

Referring to FIG. 4, the exploded view illustrates the machine 10 in greater detail, further showing one embodiment of a free-wheeling dispenser mechanism of the present invention that is collectively designated numeral 40. The support rod 36 has an upper threaded end 42 and is inserted through a threaded cover sleeve 44. The screw plug 26 can pass through an opening 46 in a boss 48 in the cap 24 to engage the threaded end 42 and secure the cap 24 such that a rim 50 of the cap 24 rests on the food storage container 22.

An alignment apparatus, collectively designated 52, is designed to retain the container 22 and the cap 24 in alignment such that when the cap 24 is tightened on the threaded support rod 36 by means of the screw plug 26, the resulting stress on the food storage container 22 is minimized to prevent breakage of the container 22. The alignment apparatus 52 is shown having a protective elastomeric gasket 54 that rests on a top edge 56 of the container 22. A spider 58 is provided to align the cap 24 with the container 22. The alignment means 52 is described in detail in copending application Serial No. 804,442, which is incorporated herein by reference. A retaining washer 72 then is tightened on the cover sleeve 44 to prevent vertical displacement of the alignment means 52.

Figure 2:
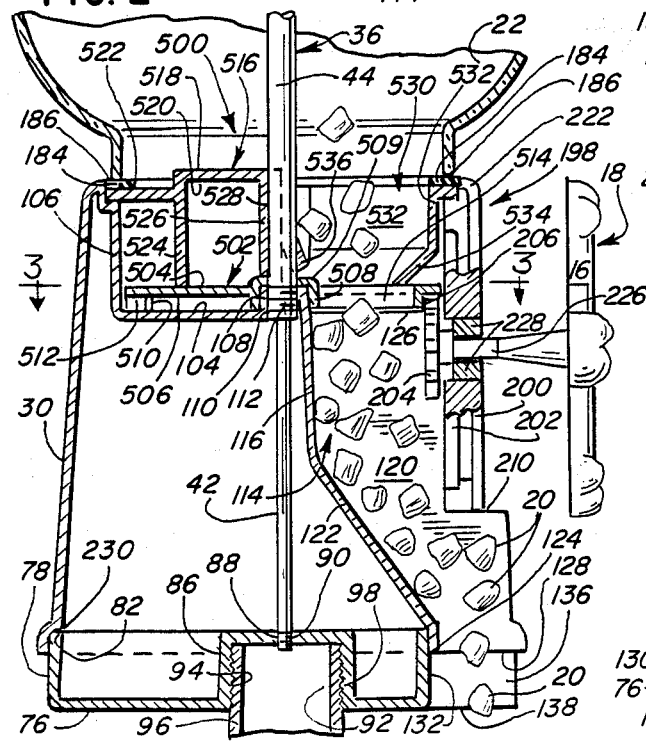
FIG. 2 is a fragmentary sectional view illustrating one embodiment of the present invention taken through the machine along the line 2—2 of FIG. 1 and in the direction indicated generally.

The housing 30 illustrated in FIG. 4 features a base 74 without the legs 32 and the feet 34. The base 74 is shown having a relatively flat lower surface or floor 76. An annular wall 78 extends upwardly from the lower surface 76 of the base 74 to form an upper edge 82 of the annular wall 78. A plurality of support ribs 84 extend from a central upstanding boss 86 to the annular wall 78 to lend rigidity to the base 74. As seen in FIG. 2, the central boss 86 has a threaded opening 88 for engaging the lower threaded end 90 of the threaded support rod 36. The boss 86 can provide an internally threaded passageway 92 at its opposite end to enable the machine 10 to be mounted on threaded end 96 of a standard 98 as illustrated partially in FIG. 2.

Referring again to FIG. 4, a cavity 100 is defined within an upper portion 102 of the housing 30. The cavity 100 is defined by a platform 104 and a sidewall 106. An upstanding boss 108 is located on the platform 104. The boss 108 has a threaded passage 110 to engage a lower end 112 of the threaded cover sleeve 44 best seen in FIG. 2.

The housing 30 has a discharge chute 114 having a rear wall 116 and pair of sidewalls 118 and 120. A sloped or inclined wall 122 extends from the rear wall 116 to terminate at a lower edge 124. The discharge chute 114 further has an entrance 126 whereby the food 20 entering the discharge chute 114 at the entrance 126 is guided along the discharge chute 114 by the walls 116, 118, 120, and 122 to the lower edge 124. The food 20 then can exit the discharge chute 114 through an exit port 128 (best seen in FIG. 2). As seen in FIG. 4, the base 74 further defines a recess 130 having a rear wall 132 and sidewalls 134 and 136 wherein the recess 130 complements and extends the exit port 128 to form an exit 138 through which the food 20 exits the machine 10. In the alternative, housing 30 can be provided with a lip (not shown) which forms an exit which bypasses the exit 138.

Figure 3:
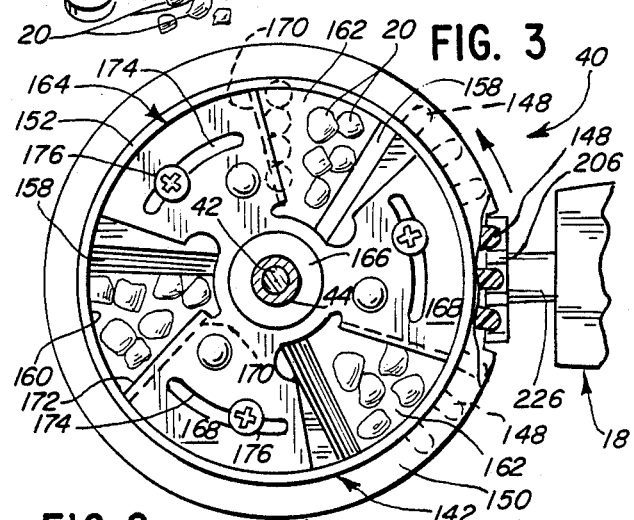
FIG. 3 is a sectional view taken through the housing of the machine along the line 3—3 of FIG. 2 and in the direction indicated generally.

Referring to FIGS. 3 and 4, the free-wheeling dispenser mechanism 40 includes an upper dispenser plate 140, a metering plate 142, and a lower dispenser plate 144. The lower dispenser plate 144 has an annular wall 146 provided with a plurality of outwardly extending equally spaced radial teeth 148. An annular circumferential flange 150 is provided about the annular wall 146.

An opening (not shown) is provided to align with the entrance 126 of the discharge chute 114 so that food 20 can pass therethrough. The lower dispenser plate 144 has a freely rotatable hub having a passage (not shown) for the support rod 36 and cover sleeve 44 to pass therethrough.

The metering plate 142 is located adjacent the lower dispenser plate 144. Metering plate 142 can be separate from the lower dispenser plate 144, or unitary therewith. FIG. 4 illustrates the metering plate 142 unitary with the lower dispenser plate 144. The metering plate 142 has an upwardly extending annular wall 152 and a centrally located hub (not shown). The hub is adapted to freely rotate about the boss 108 on the platform 104 of the housing 30 in conjunction with the lower dispenser plate 144 and to allow the support rod 36 and cover sleeve 44 to pass therethrough. A plurality of symmetrically arranged spokes 158 extend from the hub to the interior 160 of the annular wall 152. The spokes 158 collectively define a plurality of generally triangularly configured metering compartments 162 each capable of holding a metered quantity of the food 20. The metering plate 142 has an opening therethrough (not shown) aligned with the opening in the lower dispenser plate 144 such that when the opening in the lower dispenser plate 144 is aligned with the entrance 126 of the discharge chute 114, the animal food particles 20 can pass therethrough.

An adjustment plate 164 is provided adjacent the metering plate 142 to adjust the quantity of the food 20 that the metering compartments 162 will meter out (best seen in FIG. 3). The adjustment plate 164 has a hub 166 and a plurality of radially extending, symmetrically arranged, wedge-shaped blades 168 corresponding to the plurality of spokes 158 of the metering plate 142.

Each blade 168 includes a depending flange 170 that extends along one edge 172 of the blade 168. The blade 168 has an arcuate slot 174 aligned with a suitable passageway (not shown) formed in the spoke 158 of the metering plate 142. A screw 176 is used to secure the respective blade 168 of the adjustment plate 164 to the respective spoke 158 of the metering plate 142 such that the depending flange 170 extends into the compartment 162 to close off a portion of the metering compartment 162.

When it is desired to adjust the capacity of the metering compartment 162, the adjustment plate 164 is adjusted by loosening the screw 176 in the slot 174 and rotating the plate 164 relative to the metering plate 142. As the adjustment plate 164 is rotated, the depending flange 170 will be positioned closer to or further from the spoke 158 of the metering plate 142 and the metering compartment 162 will correspondingly adjust in capacity. Although the screw 176 is illustrated, any suitable locking means can be substituted so long as it functions to lock the blade 168 to the spoke 158 and so long as it can be released to reposition the adjustment plate 164 as described.

The upper dispenser plate 140, illustrated in FIG. 4, is located adjacent the metering plate 142. The upper dispenser plate 140 has an upper surface 178, a lower surface 180, and an axial passage 181 such that the rod 36 and sleeve 44 can pass therethrough. The upper surface 178 is illustrated having a circumferential recess 182 cut away such that a protective gasket 184 can be interposed between the upper dispenser plate 140 and a lower edge 186 of the container 22.

A downwardly extending annular wall 188 is situated on the lower surface 180 of the upper dispenser plate 140. The annular wall 188 is sized to allow the upwardly extending wall 152 of the metering plate 142 to nest with the annular wall 188 such that the metering plate 142 will freely rotate within the wall 188. The upper dispenser plate 140 is held in a fixed position relative to the metering plate 142 by means of at least one restraining abutment 190 located on the lower surface 180 of the upper dispenser plate 140 and complimentary restraining abutments 192 located along the sidewall 106 of the cavity 100 within the housing 30.

The upper surface 178 of the upper dispenser plate 140 further defines a guide 194 having a wall 196 extending from the upper surface 178 to the lower surface 180 to guide the food 20 (not shown) through the upper dispenser plate 140 to the metering plate 142 situated therebeneath. The guide 194 is not restricted to a specific shape or size so long as it serves to guide the food 20 therethrough. For example, the wall 196 can be perpendicular to or at an angle to the upper dispenser plate 140.

The guide 194 includes a plurality of springs 197 arranged to form a curtain along a portion of the wall 196. The springs 197 are positioned such that as the food 20 passes through the guide 194 to the rotating dispenser plates 142 and 144 beneath the stationary upper dispenser plate 140, the plurality of springs 197 will gently agitate and guide the food 20 in the general direction of the discharge chute 114 to prevent the food 20 from becoming lodged in the guide 194.

In FIG. 4, external actuator 198 is shown displaced from the housing 30 and rotated 180°. In this position, it can be seen that the actuator 198 has a faceplate 200 and a backplate 202. Located on the backplate 202 is a pinion gear 204 having a plurality of equally spaced teeth 206 extending radially therefrom and spaced apart such that when the machine 10 is assembled, the teeth 206 will cooperatively mesh with the radial teeth 148 located on the lower dispenser plate 144 to rotate the lower dispenser plate 144 (best seen in FIG. 3). Although the actuator 198 is shown to include a gear, any suitable mechanism can be substituted to affect the translation of motion from the external actuator 198 to the lower dispenser plate 144. For example, a worm, a ratchet, or even a friction type mechanism can affect the required translation.

The housing 30 of the animal food dispensing machine 10 has a recess 208 including a bottom ledge 210 and side edges 212 and 214. The faceplate 200 of the external actuator means 198 includes a bottom edge 216, side edges 218 and 220, and a top ledge 222. When the actuator 198 is installed in the housing 30, the actuator 198 is rotated 180° such that the bottom edge 216 of the faceplate 200 rests on the bottom ledge 210 of the recess 208 and the side edges 218 and 220 of the faceplate 200 mate with the side edges 214 and 212, respectively, of the recess 208 in the housing 30. The top ledge 222 of the faceplate 200 then will mate with an upper edge 224 of housing 30.

Referring to FIG. 2, an actuator wheel shaft 226 extends from the actuator wheel 18 through a bearing 228 located in the faceplate 200 and backplate 202 to engage the gear 204. The actuator wheel shaft 226 is journaled for free-wheeling rotation within the bearing 228 to allow the actuator wheel 18 to freely rotate in either a clockwise or a counterclockwise direction.

Assembly of the machine 10 can be accomplished by inserting the threaded rod 36 through the threaded passage 110 in the platform 104 of the housing 30 and securing the lower threaded end 90 of the rod 36 within the threaded opening 88 of the central boss 86 of the base 74 (best seen in FIG. 2). Referring to FIG. 4, a lower edge 230 of the housing 30 will then rest on the upper edge 82 of the base 74. The free-wheeling dispenser mechanism, generally designated 40, is seated on an annular ledge 232 formed along the interior sidewall 106 of the cavity 100 in the housing 30. The sleeve 44 is placed over the rod 36 such that it will pass through the dispenser mechanism 40 and the lower end 112 of the sleeve 44 is secured within the threaded passage 110.

The dispenser mechanism, collectively designated 40, is seated on the annular ledge 232 of the housing 30 and the protective gasket 184 is seated on the circumferential recess 182 of the upper dispenser plate 140 of the dispenser mechanism 40. The animal food storage container 22 is seated on the protective gasket 184 and the protective gasket 54 is placed on the top edge 56 of the container 22.

The alignment apparatus 52 is positioned over the support rod 36 and cover sleeve 44 to engage the top edge 56 of container 22. The retaining washer 72 then is tightened on the sleeve 44 to secure the alignment apparatus in place. Thereafter, the cap 24 is positioned over the support rod 36 and the assembly is completed by fastening the cap 24 on the support rod 36 by means of the screw plug 26. Of course, the sequence of the assembly of the machine 10 can vary as long as the relative positions of the component parts of the machine 10 remain unchanged.

A second embodiment of a free-wheeling dispenser mechanism is generally designated by the numeral 500 and is best seen with reference to FIG. 2. A lower dispenser plate 502 includes an upper surface 504 and a lower surface 506. The lower dispenser plate 502 further includes a hub 508 having a passage 509 such that the support rod 36 and sleeve 44 can pass therethrough. The hub 508 is centrally located on the lower dispenser plate 502. An annular wall 510 depending from the lower surface 506 is provided with a plurality of outwardly extending equally spaced radial teeth 512 spaced apart such that when the animal food dispensing machine 10 is assembled, the radial teeth 512 will cooperatively mesh with the radial teeth 206 located on the actuator 198 to rotate the lower dispenser plate 502 in relation to the angular distance through which the external actuator 198 is rotated. An opening 514 is constructed and arranged such that when the lower dispenser plate 502 is rotated by the external actuator 198, the opening 514 is periodically aligned with the entrance 126 of the discharge chute 114 such that the animal food particles 20 can pass therethrough.

An upper dispenser plate 516 having an upper surface 518 and a lower surface 520 is located in a fixed position adjacent to the lower dispenser plate 502. The upper surface 518 has a circumferential recess 522 cut away such that the protective gasket 184 can be interposed between the upper dispenser plate 516 and the lower edge 186 of the food storage container 22. A wall 524 extends downwardly from the lower surface 520 of the upper dispenser plate 516 to the upper surface 504 of the lower dispenser plate 502 and is positioned such that the lower dispenser plate 502 can freely rotate beneath the upper dispenser plate 516. A second wall 526 defines a passage 528 such that the support rod 36 and sleeve 44 can pass therethrough.

The upper dispenser plate 516 further defines a guide 530 having a wall 532 to guide the food 20 through the upper dispenser plate 516 to the lower dispenser plate 502 therebeneath. The guide 530 is not restricted to a specific shape or size so long as it serves to guide the food 20 therethrough. For example, the guide 530 illustrated in FIG. 2 is seen to have a sloped wall 534 but alternative guide construction is within the scope of the present invention.

The guide 530 can further include a plurality of springs 536 arranged to form a curtain along a portion of the wall 532. The springs 536 are positioned on the wall 532 such that, as the food 20 passes through the guide 530 to the rotating lower dispenser plate 502 beneath the stationary upper dispenser plate 516, the springs 536 will gently agitate and guide the food 20 in the general direction of the discharge chute 114, to prevent the food 20 from becoming lodged in the guide 530.

The actuator 198 is constructed such that the actuator wheel 18 is freely rotatable in either clockwise or counterclockwise direction when any of the levers 16 thereof are pushed by the animal 12. As the actuator wheel is rotated through a given angular distance, the lower dispenser plate 502 of the internal dispenser mechanism 500 is rotated to align the opening 514 with the discharge chute 114 in the housing 30. Thus aligned, the food 20 from the food storage container 22 which is fed by gravity to the upper dispenser plate 516 is swept by the plurality of springs 536 in the general direction of the discharge chute 114 and is guided through the guide 530, the opening 514, and the discharge chute 114 to the exterior of the housing 30. The quantity of food 20 that is dispensed is directly related to the angular distance that the actuator wheel is rotated, and the number of times or the duration of time that the opening 514 and the discharge chute 114 are aligned as a result of the cooperating relationship between the actuator 198 and the lower dispenser plate 502.

Since the actuator wheel 18 can be rotated in both clockwise and counterclockwise directions, the machine 10 can be actuated from the front or from a side of the machine 10. Therefore, the animal 12 easily can be trained to engage and move the actuator wheel 18 whenever food is desired.

The machine 10 has been described as constructed and arranged especially for operation by a domesticated animal or pet. Variations in size and configuration of component parts may occur to a skilled artisan without departing from the scope of the invention as set forth in the appended claims.

What is claimed:

1. An animal granular food dispensing machine having a free-wheeling metered dispensing mechanism adapted to be manually operated by a domesticated animal, said machine comprising:
    A. A housing (30) having a base (74) for supporting the machine in operation with its longitudinal axis vertically oriented, said housing having an interior horizontal platform (104) vertically displaced from said base;
    B. A granular food storage container globe (22) mounted spaced above said platform on and communicating with said housing for receiving and storing granular food;
    C. A discharge chute (114) integral with said housing and opening at one end thereof (126) through said platform, the opposite end of said chute defining an exit port (128) to ambient atmosphere;
    D. A boss (108) upstanding from said platform coaxial with the longitudinal axis of said machine;
    E. A lower dispenser plate (144) mounted on said boss for free rotation on a vertical axis in opposite angular directions and having at least one opening therethrough arranged to be moved into registry with said opening (126) into said discharge chute for passage of granular food from said housing into said chute;
    F. A metering plate (142) located adjacent said lower dispenser plate and mounted for free rotation on a vertical axis in opposite angular directions in synchronization with said lower dispenser plate, said metering plate having an upwardly extending wall (152) extending along the perimeter thereof and a plurality of symmetrically arranged spokes (158) extending radially outward to said wall (152) to define a plurality of generally triangularly shaped metering compartments (162), each compartment (162) communicating with said at least one opening in said lower dispenser plate (144);
    G. An upper dispenser plate (140) mounted in a fixed position adjacent said lower dispenser plate (144) and having guide means for guiding food into said lower dispenser plate; and
    H. Free-wheeling external actuator means (198) operably connected to rotate said lower dispenser plate freely in opposite angular directions whereby to align said lower dispenser plate opening with said opening into said discharge chute so that said metered quantity of food can be dispensed to ambient atmosphere through said exit port (128);
    I. Said actuator means (198) and lower dispenser plate (144) having cooperating meshed gears for rotating said lower dispenser plate to align said openings for discharging food to ambient atmosphere, said actuator means including an external actuator wheel (18) adapted to be engaged by the animal for freely rotating the actuator wheel in opposite angular directions, said wheel being rotatable on an axis transverse to the longitudinal axis of the machine and the axis of rotation of said dispenser plates.

2. The mechanism as defined in claim 1 wherein said actuator means is rotatable through 360° in either a clockwise or a counterclockwise direction to discharge said quantity of food corresponding to an angular distance through which said external actuator means is rotated.

3. The mechanism as defined in claim 1 wherein said upper plate is further provided with a plurality of springs constructed and arranged to sweep said food toward said discharge chute.

4. The mechanism as defined in claim 1 wherein said metered quantity adjustment means include an adjustment plate adapted to compliment said metering plate, said adjustment plate having a plurality of wedge-shaped blades corresponding to said spokes of said metering plate, said adjustment plate further having a depending flange extending along one edge of said blade, said flange constructed and arranged to mate with said generally triangularly configured metering compartment of said metering plate such that rotation of said adjustment plate relative to said metering plate will adjust said quantity of food dispensed.

5. The mechanism as defined in claim 4 further including a locking means adapted to secure said adjustment plate in place relative to said metering plate, said locking means including an arcuate slot located on said wedge-shaped blade of said adjustment plate such that a fastening means passing therethrough can be loosened to move said adjustment plate to a new position and thereafter said fastening means can be tightened to lock said adjustment plate in position relative to said metering plate.

* * * * *

UNITED STATES PATENT AND TRADEMARK OFFICE
CERTIFICATE OF CORRECTION

PATENT NO. : 4,823,738
DATED : April 25, 1989
INVENTOR(S) : Arthur Gold

It is certified that error appears in the above-identified patent and that said Letters Patent is hereby corrected as shown below:

After claim 5, insert the following claim:

--6. A dispensing machine as described in claim 1, in which said actuator wheel has a plurality of radially extending levers (16).--

On the title page, "5 Claims, 1 Drawing Sheet" should read

-- 6 Claims, 1 Drawing Sheet --.

Signed and Sealed this

Tenth Day of October, 1989

Attest:

DONALD J. QUIGG

Attesting Officer

Commissioner of Patents and Trademarks